(12) United States Patent
Koo et al.

(10) Patent No.: US 12,173,215 B2
(45) Date of Patent: Dec. 24, 2024

(54) MXENE WITH EXCELLENT MECHANICAL STRENGTH AND FAST AND HIGH-YIELD ANHYDROUS SYNTHESIS METHOD THEREOF

(71) Applicant: KOREA INSTITUTE OF SCIENCE AND TECHNOLOGY, Seoul (KR)

(72) Inventors: Chong Min Koo, Seoul (KR); Tae Gon Oh, Seoul (KR); Seung Jun Lee, Seoul (KR); Seon Joon Kim, Seoul (KR); Soon Man Hong, Seoul (KR); Seung Sang Hwang, Seoul (KR); Albert Lee, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 37 days.

(21) Appl. No.: 17/570,386

(22) Filed: Jan. 7, 2022

(65) Prior Publication Data
US 2023/0136591 A1    May 4, 2023

(30) Foreign Application Priority Data
Oct. 29, 2021    (KR) .................. 10-2021-0146358

(51) Int. Cl.
*C09K 13/06*    (2006.01)
*C01B 32/90*    (2017.01)
(Continued)

(52) U.S. Cl.
CPC .............. *C09K 13/06* (2013.01); *C01B 32/90* (2017.08); *C01B 32/921* (2017.08); *C08K 3/14* (2013.01); *C09G 1/00* (2013.01); *C09G 1/02* (2013.01); *C09G 1/06* (2013.01); *C09K 3/1463* (2013.01); *C09K 13/00* (2013.01); *C09K 13/04* (2013.01); *C09K 13/08* (2013.01); *C11D 3/042* (2013.01);
(Continued)

(58) Field of Classification Search
None
See application file for complete search history.

(56) References Cited

U.S. PATENT DOCUMENTS

| 2006/0255315 | A1* | 11/2006 | Yellowaga | ............... | C11D 3/43 257/E21.255 |
| 2020/0211856 | A1* | 7/2020 | Wada | ................ | H01L 21/30604 |
| 2020/0399565 | A1* | 12/2020 | Hsu | ................ | H01L 21/02063 |

FOREIGN PATENT DOCUMENTS

| KR | 20200071292 A | 6/2020 | |
| WO | WO2009073596 | * 11/2009 | ............. C09K 13/00 |

OTHER PUBLICATIONS

Korean Office Action for Korean Patent Application No. 10-2021-0146358 dated Jan. 21, 2024 (Translation only).
(Continued)

*Primary Examiner* — Jiong-Ping Lu
(74) *Attorney, Agent, or Firm* — CANTOR COLBURN LLP

(57) ABSTRACT

The present invention relates to an etching composition and a method of producing a MXene. The etching composition of the present invention can stably and quickly produce a MXene at high temperature. The etching composition of the present invention can produce a MXene in high yield. The etching composition of the present invention can easily produce various types of MXenes. A method using the etching composition of the present invention can produce a MXene having excellent electrochemical and mechanical properties.

17 Claims, 16 Drawing Sheets

(51) Int. Cl.

| | |
|---|---|
| *C01B 32/921* | (2017.01) |
| *C08K 3/14* | (2006.01) |
| *C09G 1/00* | (2006.01) |
| *C09G 1/02* | (2006.01) |
| *C09G 1/06* | (2006.01) |
| *C09K 3/14* | (2006.01) |
| *C09K 13/00* | (2006.01) |
| *C09K 13/04* | (2006.01) |
| *C09K 13/08* | (2006.01) |
| *C11D 3/04* | (2006.01) |
| *C11D 3/24* | (2006.01) |
| *C11D 7/08* | (2006.01) |
| *C11D 7/10* | (2006.01) |
| *C11D 7/28* | (2006.01) |

(52) U.S. Cl.
 CPC ............... *C11D 3/046* (2013.01); *C11D 3/24* (2013.01); *C11D 3/245* (2013.01); *C11D 7/08* (2013.01); *C11D 7/10* (2013.01); *C11D 7/28* (2013.01)

(56) References Cited

OTHER PUBLICATIONS

Mohamed Alhabeb et al., "Guidelines for Synthesis and Processing of Two-Dimensional Titanium Carbide (Ti3C2Tx MXene)", American Chemical Society, 29, Aug. 25, 2017, 7633-7644.

* cited by examiner

MXENE WITH EXCELLENT MECHANICAL STRENGTH AND FAST AND HIGH-YIELD ANHYDROUS SYNTHESIS METHOD THEREOF

CROSS-REFERENCE TO RELATED APPLICATION

This application claims priority to Korean Patent Application No. 10-2021-0146358, filed on Oct. 29, 2021, and all the benefits accruing therefrom under 35 U.S.C. § 119, the content of which in its entirety is herein incorporated by reference.

BACKGROUND

1. Field of the Invention

The present invention relates to a MXene having excellent mechanical strength, and a fast and high-yield anhydrous method of synthesizing the same. More particularly, the present invention relates to an etching composition, a method of synthesizing a MXene using the same, and a MXene produced by the method.

2. Discussion of Related Art

A MXene refers to a two-dimensional crystal structure composed of three to seven atomic layers. Specifically, a MXene refers to a transition metal carbide, transition metal nitride, transition metal carbonitride, or the like. MXenes have high electrical conductivity and excellent mechanical properties. Therefore, MXenes are attracting attention as a next-generation two-dimensional nanomaterial suitable as an active material, electrode, additive, and the like in the fields of energy storage, flexible devices, electromagnetic wave shielding, and the like.

MXene materials are a compound (MX) of transition metals (M: Ti, V, Cr, Ta, Nb, etc.) and carbon or nitrogen (X: C or N), and are named using the suffix "-ene" which indicates electrical conductivity. Usually, a MXene is prepared by selectively etching interlayer element A in a MAX material, which is a three-component layered compound formed of a transition metal (M), carbon or nitrogen (X), and an interlayer element (A: Group 13 element or Group 14 element, such as Al, Si, Ga, etc.). Here, the etching generally means chemical etching. Conventionally, the etching process is mainly carried out using a hydrogen fluoride (HF) aqueous solution, or an aqueous solution including a strong acid and an inorganic salt including fluorine. However, in a conventional method, the etching process is carried out for a long time ranging from one day to several days.

When M-A bonds in the MAX material are dissociated are located on the surface of the MXene, the transition metal elements exposed on the surface of MXene are highly reactive. They easily react with water, fluorine, oxygen, and the like included in the etching solution. As a result, hydrophilic functional groups such as —F, —OH, and —O— are bonded to the surface of the MXene. Since a bond of transition metal and fluorine or oxygen is very strong, it is difficult to remove it in a post-reaction process.

Therefore, the properties of a MXene depend on the conditions of its synthesis. Due to the nature of a two-dimensional nanomaterial, the surface functional groups are largely involved in the formation of electronic band in MXene. That is, the surface functional groups have a great influence on the electrical and mechanical properties of MXenes. In particular, a large amount of hydrophilic functional groups are present on the surface of a MXene synthesized under hydrous reaction conditions, and these have strong moisture adsorption characteristics. Therefore, in order to apply MXenes to the electrochemical field which is sensitive to moisture, it is necessary to study an anhydrous synthesis method capable of controlling the type and amount of surface functional groups and the like.

Recently, a synthesis method of controlling functional groups on the surface of a MXene under anhydrous conditions has been reported. However, the synthesis method has a slower reaction rate and lower yield than a conventional hydrous synthesis method.

SUMMARY OF THE INVENTION

Non-limiting objectives of the present invention are as follows.

The present invention is directed to providing an etching composition capable of stably and quickly producing MXenes at high temperature.

In addition, the present invention is directed to providing an etching composition capable of producing MXenes in high yield.

In addition, the present invention is directed to providing an etching composition capable of easily producing various types of Menes.

In addition, the present invention is directed to providing MXenes having excellent electrochemical and mechanical properties.

In addition, the present invention is directed to providing a method of producing MXenes having excellent electrochemical and mechanical properties.

Aspects of the present invention for achieving the above-described objectives are as follows.

An etching composition of the present invention includes: an etchant including a halogen element; an ionic compound; an acid having a pKa of 3 or less; and an anhydrous solvent.

A method of producing a MXene of the present invention includes a step of synthesizing a MXene including etching element A in a MAX material, and the etching of the element A in the MAX material in the step of synthesizing a MXene is carried out using the etching composition according to the above.

A MXene of the present invention is produced by the above-described method.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
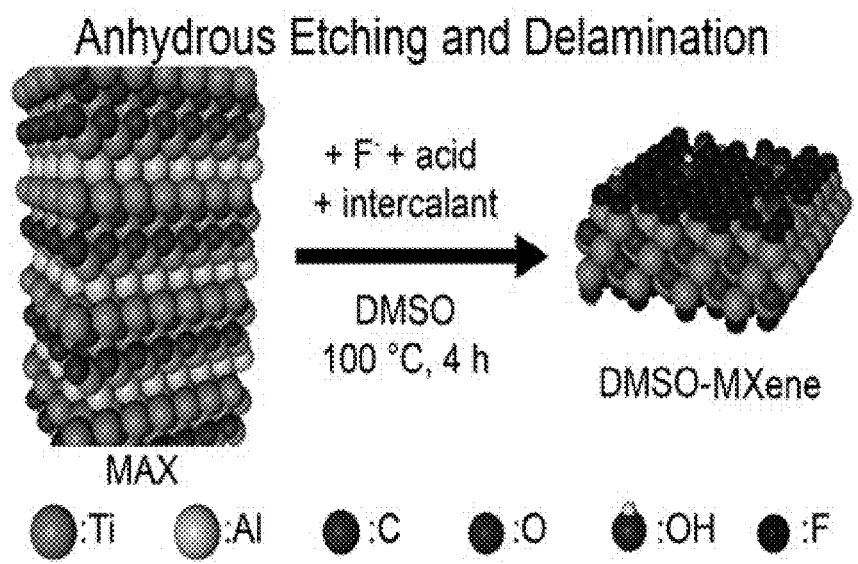
FIG. 1 is a schematic diagram illustrating a process of applying an etching composition of the present invention to the production of a MXene.

Hereinafter, configurations of the present invention will be described in more detail.

In the present invention, when temperature and/or pressure affect specific physical properties, unless otherwise specified, the temperature is room temperature, and the pressure is normal pressure.

In the present invention, room temperature means a temperature in its natural state without being specially increased or decreased. The room temperature may be, for example, 23° C. or 25° C.

In the present invention, normal pressure means a pressure in its natural state without being specially increased or decreased, that is, atmospheric pressure.

In one aspect, the present invention relates to an etching composition. The etching composition is an anhydrous etching composition. In addition, the etching composition is suitable for etching a MAX material, specifically, chemically etching element A in a MAX material represented as "MAX."

In the present invention, anhydrous means having no water. Here, having no water means that water is not present at all, or a very small amount of water is present. For example, in the present invention, when a specific material contains 1 ppm or less, 0.5 ppm or less, or 0.1 ppm or less water, the material may be referred to as an anhydrous material.

An etching composition of the present invention includes at least an etchant, an ionic compound, an acid, and an anhydrous solvent.

The above-described etchant is a component that removes element A (i.e., Group 13 element or Group 14 element), which is an element forming a MAX, by forming a bond with the element in the production of a MXene. Usually, a halogen element forms a compound with a Group 13 element or a Group 14 element. Therefore, the etchant includes a halogen element. In the present invention, a compound including fluorine, which is a halogen element, is used as an etchant.

In the above, when the ionic compound is used in the production of a MXene, the ionic compound is intercalated between layers forming the MXene. As a result, in a MXene formed of a plurality of layers, the ionic compound may be intercalated between the layers to cause delamination between the layers. This effect is mainly exerted by cations in the ionic compound.

When the etching composition is applied to a high-temperature process, the above-described acid is capable of preventing damage to an object to be etched (in the present invention, MAX material). Specifically, as the acid included in the etching composition, an acid known in the field as a so-called "strong acid" is applied. Therefore, the etching composition of the present invention includes an acid having a pKa of 3 or less. In another example, the pKa of the acid may be 2.5 or less or 2.2 or less, and lower pK as are more advantageous.

The anhydrous solvent makes it possible to apply the etching composition of the present invention to a high-temperature etching process. The etching composition of the present invention enables etching at a higher temperature than a conventional process using a hydrous solvent. Therefore, as the anhydrous solvent, a solvent having a boiling point exceeding 100° C., which is the boiling point of water, may be used.

The etching composition of the present invention is particularly appropriate for a process of producing a MXene by etching a MAX material. That is, in the present invention, the etching composition can be used for etching element A of a MAX material.

In the present invention, when the etching composition is applied to an etching process of a MAX, specifically, the production of a MXene, after appropriately adjusting the type and amount of components included in the etching composition, a MXene can be stably and quickly produced in high yield at high temperature.

In one example, the concentration of the etchant may be in the range of 50 mg/mL to 300 mg/mL. In another example, the concentration of the etchant may be 60 mg/mL or more, 70 mg/mL or more, 80 mg/mL or more, 90 mg/mL or more, 100 mg/mL or more, 110 mg/mL or more, 120 mg/mL or more, 130 mg/mL or more, 140 mg/mL or more, or 150 mg/mL or more, and 250 mg/mL or less, 200 mg/mL or less 190 mg/mL or less, 180 mg/mL or less, 170 mg/mL or less, 160 mg/mL or less, or 150 mg/mL or less.

In one example, the concentration of the ionic compound may be in the range of 50 mg/'mL, to 300 mg/mL. In another example, the concentration of the ionic compound may be 60 mg/mL or more 70 mg/mL or more, 80 mg/mL or more, 90 mg/mL or more 100 mg/mL or more, 110 mg/mL or more, 120 mg/mL or more, 130 mg/mL or more, 140 mg/mL or more, or 150 mg/mL or more, and 250 mg/mL or less, 200 mg/mL or less 190 mg/mL or less, 180 mg/mL or less 170 mg/mL or less, 160 mg/mL or less, or 150 mg/mL or less.

In one example, a liquid acid may be applied as the acid. In this case, the application amount (volume) of the acid may be adjusted so that the etching composition has a desired normal acid concentration.

In one example, the volume fraction of the acid in the composition may be in the range of 5% to 30%.

In the present invention, the type of the above-described etchant is not particularly limited. As the etchant, a compound capable of providing a fluorine anion (F⁻), upon dissociation may be applied.

In one example, as the etchant, at least one of $NH_4HF_2$, pyridinium fluoride, hydrofluoric acid pyridine, trimethylamine trihydrofluoride, tetrabutylammonium fluoride, ammonium fluoride, a salt of $PF_6^-$, and a metal fluorine compound may be applied. In the present invention, $NH_4HF_2$ was actually applied.

In one example, the cation of the ionic compound may induce interlayer delamination of a MXene. Specifically, in the present invention, as the ionic compound, at least one of a salt of an ammonium cation and a salt of a metal cation may be applied. In the present invention, a salt of an ammonium cation is actually applied. Types of counter anions of the cation are not particularly limited. As the ionic compound, an ionic compound having an anion such as $PF_6^-$, $ClO_4^-$, $BF_4^-$, $Cl^-$, $Br^-$, $I^-$, $SCN^-$, or the like may be applied.

Meanwhile, in the composition of the present invention, it may be advantageous to apply an ionic compound having $PF_6^-$ anions in consideration of miscibility with an anhydrous solvent. Specifically, as the ionic compound, at least one of ammonium hexafluorophosphate, tetrabutylammonium hexafluorophosphate, tetramethylammonium hexafluorophosphate, ammonium tetrafluoroborate, ammonium perchlorate, lithium hexafluorophosphate, sodium hexafluorophosphate, and potassium hexafluorophosphate may be applied. More specifically, as the ionic compound, one of $NH_4PF_6$, tetrabutylammonium hexafluorophosphate, and tetramethylammonium hexafluorophosphate may be applied. In the present invention, a combination of two or more of the above may also be selected as the ionic compound.

As described above, as the acid, a so-called strong acid having the above-described function, that is, a function of preventing damage to an object to be etched even when the etching process is carried out at high temperature, may be applied. In one example, the acid may be at least one of a sulfonic acid-based compound, a sulfuric acid-based compound, a phosphoric acid-based compound, and an acetic acid-based compound.

In one example, the anhydrous solvent may be a solvent capable of dissolving the acid. As the anhydrous solvent, at least one of DMSO, glycerin, N,N-dimethylformamide, propylene carbonate, tetrahydrofuran, a ketone-based solvent, an alcohol-based solvent such as ethylene glycol, and the like may be used. In the present invention, DMSO is actually applied as the anhydrous solvent. DMSO may be used in consideration of affinity with a MAX or MXene, which will be described below.

The etching composition of the present invention may additionally include a known component necessary to obtain an effect of selectively etching element A in a MAX material by applying the composition to etching, specifically, the production of a MXene, but the present invention is not limited thereto.

In another aspect, the present invention relates to a method of producing a MXene.

The method of the present invention is performed using an anhydrous solution. Specifically, the method of the present invention uses the etching composition of the present invention, which is an anhydrous solution.

The method includes at least a step of etching element A in a MAX material. Since a MXene is produced by etching element A in a MAX material, hereinafter, the relevant step will be referred to as a step of synthesizing a MXene. The method of the present invention uses the etching composition of the present invention in the step of synthesizing a MXene.

Through this, the method of the present invention is capable of producing a MXene having both excellent mechanical properties and excellent electrochemical properties. Specifically, the method of the present invention is stably producing such a MXene in high yield and in a short time.

The method of the present invention is performed using the etching composition, which is an anhydrous solution. Therefore, the method of the present invention can be performed at least at a higher temperature than a conventional method of using a hydrous solvent. That is, the method of the present invention does not damage a MXene even though it is performed at a higher temperature than a conventional method. According to one embodiment, the step of synthesizing a MXene may be performed at a temperature of 50° C. or more. In the method of the present invention, the step of synthesizing a MXene may even be performed at a temperature of more than 100° C.

Of course, the step of synthesizing a MXene may also be performed at a temperature in the range of 30° C. to 50° C. However, in this case, the synthesis process does not proceed quickly, and somewhat low electrical conductivity may be attained.

In general, the reaction rate increases with an increasing reaction temperature. In conventional methods, it usually takes a few days to produce a MXene. Therefore, in the method of the present invention, the step of synthesizing a MXene is performed for a time period of 24 hours or less. The shorter the time, the better.

The method of the present invention is capable of producing various types of MXenes. That is, a wide variety of MAX materials can be applied in the method of the present invention. In one example, the MAX material may be represented by the following Chemical Formula 1:

$$M_{n+1}AX_n \quad \text{[Chemical Formula 1]}$$

In Chemical Formula 1, M is a transition metal, A is a Group 13 element or a Group 14 element, X is carbon or nitrogen, and n is an integer in the range of 1 to 4.

In addition to the above-described processes, the method of the present invention may additionally include other processes necessary for the production of a MXene, for example, a process of filtering the synthesized MXene.

In still another aspect, the present invention relates to a MXene. The MXene of the present invention is produced by the method of the present invention.

As described above, when a MXene is produced by the method of the present invention, the surface of the MXene can be fluorinated. A MXene having a fluorinated surface can have excellent mechanical properties.

Therefore, according to one embodiment, the MXene of the present invention has higher tensile strength than a conventional MXene. For example, the MXene of the present invention may have a tensile strength of 100 MPa or more. This is at least five times the strength of a conventional MXene. The tensile strength can be measured by a method described below.

Hereinafter, the present invention will be described in more detail by way of Examples. However, the following Examples do not limit the scope of the present invention.

Example 1

MXene

A MXene was produced according to the following procedure.
(1) An etching composition was obtained by mixing, per 1 mL of a solution, 25 mg of a $Ti_3AlC_2$ powder, 150 mg of $NH_4F_2$, 150 mg of $NH_4PF_6$, and 150 μl of methanesulfonic acid with DMSO.
(2) The solution was stirred at a temperature of 100° C. for four hours to carry out an etching reaction of $Ti_3AlC_2$.
(3) The reaction product was washed about three to five times with DMSO.
(4) The result of (3) was mixed with distilled water (so that the volume ratio of DMSO and water was 8:2) and washed with a centrifuge, and thus a monolayer $Ti_3C_2T_x$ MXene was obtained.

Example 2

MXene

A MXene was produced in the same manner as in Example 1 except that an etching reaction was carried out at a temperature of 70° C. for 24 hours.

Example 3

MXene

A MXene was produced in the same manner as in Example 1 except that an etching reaction was carried out at a temperature of 50° C. for 48 hours.

Example 4

MXene

A MXene was produced in the same manner as in Example 1 except that an etching reaction was carried out at a temperature of 35° C. for 144 hours.

Example 5

MXene

A MXene was produced in the same manner as in Example 1 except that 60 μl of sulfuric acid was applied instead of methanesulfonic acid.

Example 6

MXene

A MXene was produced in the same manner as in Example 1 except that 75 μl of phosphoric acid was applied instead of methanesulfonic acid.

Example 7

MXene

A MXene was produced in the same manner as in Example 1 except that 150 mg of tetrabutylammonium hexafluorophosphate was applied instead of $NH_4PF_6$.

Example 8

MXene

A MXene was produced in the same manner as in Example 1 except that 150 mg of tetramethylammonium hexafluorophosphate was applied instead of $NH_4PF_6$.

Example 9

MXene

A MXene was produced in the same manner as in Example 1 except that 25 mg of $Ti_3AlCN$ was applied instead of the $Ti_3AlC_2$ powder.

Example 10

MXene

A MXene was produced in the same manner as in Example 1 except that 25 mg of $Mo_2TiAlC_2$ was applied instead f the $Ti_3AlC_2$ powder.

Example 11

MXene

A MXene was produced in the same manner as in Example 1 except that 25 mg of $Ta_4AlC_3$ was applied instead of the $Ti_3AlC_2$ powder.

Comparative Example 1

MXene (1) An etching composition was obtained by mixing a $Ti_3AlC_2$ powder, 1 M LiF, and a 9 M aqueous HCl solution,
(2) The solution was stirred at a temperature of 35° C. for 24 hours to carry out an etching reaction of $Ti_3AlC_2$.
(3) The reaction product was washed and purified with distilled water.

Comparative Example 2

MXene

A MXene was produced according to the following procedure.

(1) An etching composition was obtained by mixing, per 1 mL of a solution, 25 mg of a $Ti_3AlC_2$ powder and 150 mg of $NH_4F_2$ with DMSO.
(2) The solution was stirred at a temperature of 100° C. for four hours to carry out an etching reaction of $Ti_3AlC_2$.
(3) The reaction product was washed about three to five times with DMSO.
(4) The result of (3) was mixed with distilled water (so that the volume ratio of DMSO and water was 8:2) and washed with a centrifuge, and thus a monolayer $Ti_3C_2T_x$ MXene was obtained.

Comparative Example 3

MXene

A MXene was produced in the same manner as in Comparative Example 2 except that an etching reaction was carried out at a temperature of 70° C. for 24 hours.

Comparative Example 4

MXene

A MXene was produced in the same manner as in Comparative Example 2 except that an etching reaction was carried out at a temperature of 50° C. for 48 hours.

Comparative Example 5

MXene

A MXene was produced in the same manner as in Comparative Example 2 except that an etching reaction was carried out at a temperature of 35° C. for 144 hours.

Experimental Example 1

Observation of Microstructure of MXene

Figure 2:
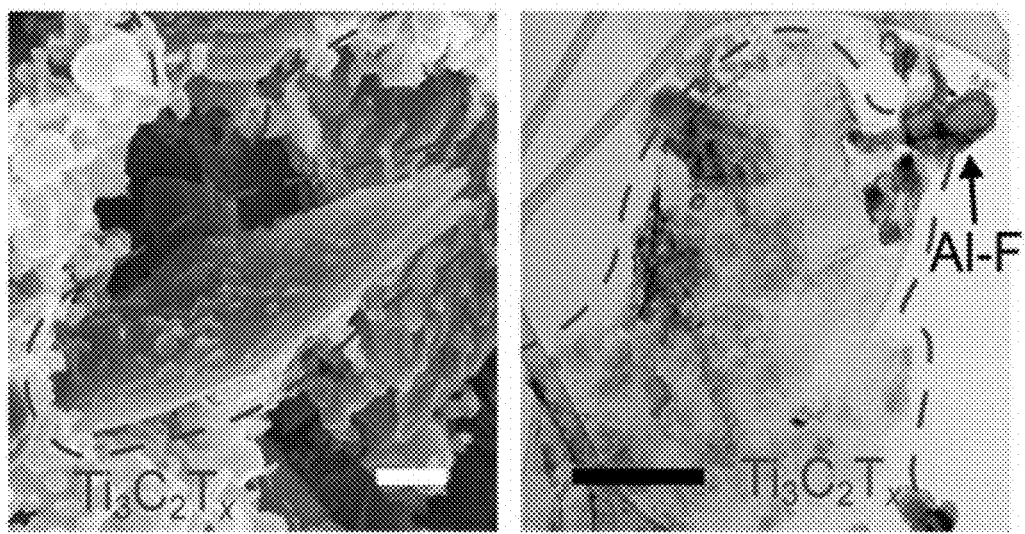
FIG. 2 shows electron microscope (scanning electron microscope (SEM) and transmission electron microscope (TEM)) images illustrating the results of observing the microstructure of a two-dimensional MXene produced by a method of the present invention.

A photographic image of the MXene of Example 1 was obtained using an SEM (Hitachi Regulus 8230) and a TEM (FEI Tecnai F20 G2). In FIG. 2, MXene particles separated in the form of thin flakes and various compounds of aluminum and fluorine in the form of salts, which are by-products, can be seen. The SEM image was obtained under the conditions of an accelerating voltage of 5 kV and an emission current of 15 μA. The TEM image was obtained under the condition of an accelerating voltage of 200 kV.

Figure 3:
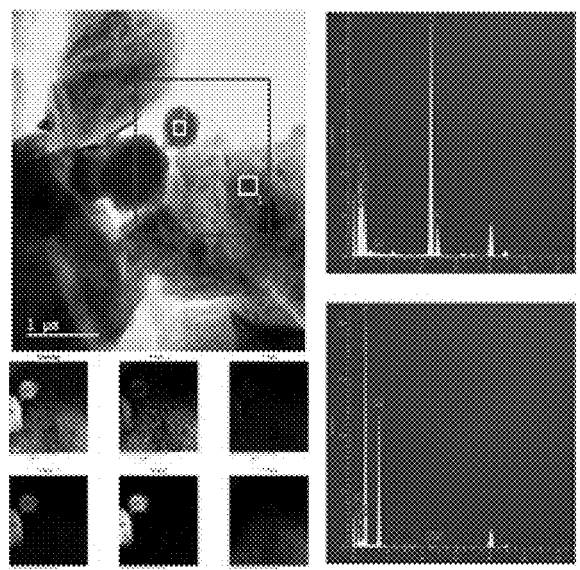
FIG. 3 shows the results of mapping the constituent element composition of a two-dimensional MXene produced by a method of the present invention and analyzing each region by energy-dispersive X-ray spectroscopy (EDS)

An image of the MXene of Example 1, elemental analysis maps, and the compositional analysis results of regions observed in the image were obtained using EDS (UTIM® Max TLE detector, Oxford Instruments) and a scanning transmission electron microscope (STEM; FEI Tecnai F20 G2) and are shown in FIG. 3. In FIG. 3, EDS signals for Ti and Al can be seen in different regions. Through this, it can be seen that a MXene can be produced by selectively etching aluminum in a MAX material and that aluminum forms compounds (by-products) with fluorine. This means that the synthesis of a MXene material is successful.

Figure 4:
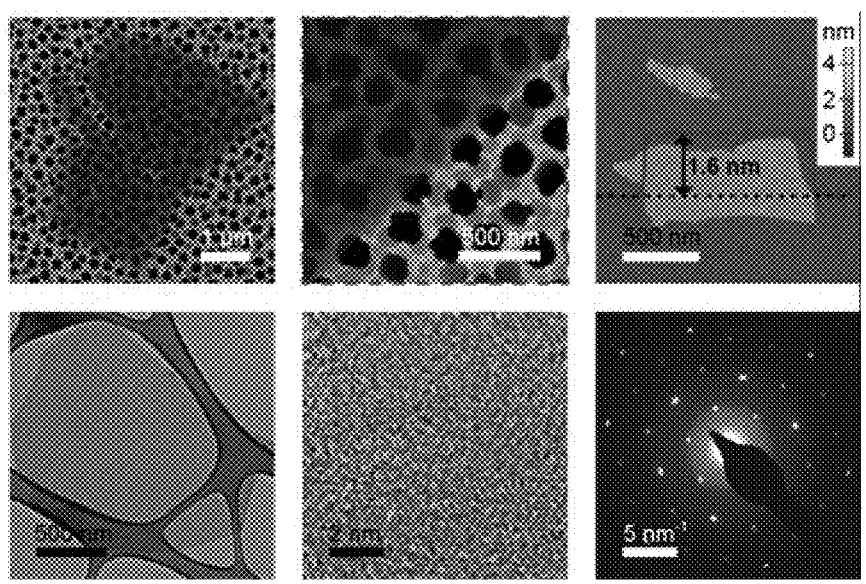
FIG. 4 shows electron microscope images of a Ti$_3$C$_2$T$_x$ MXene single sheet.
Figure 5:
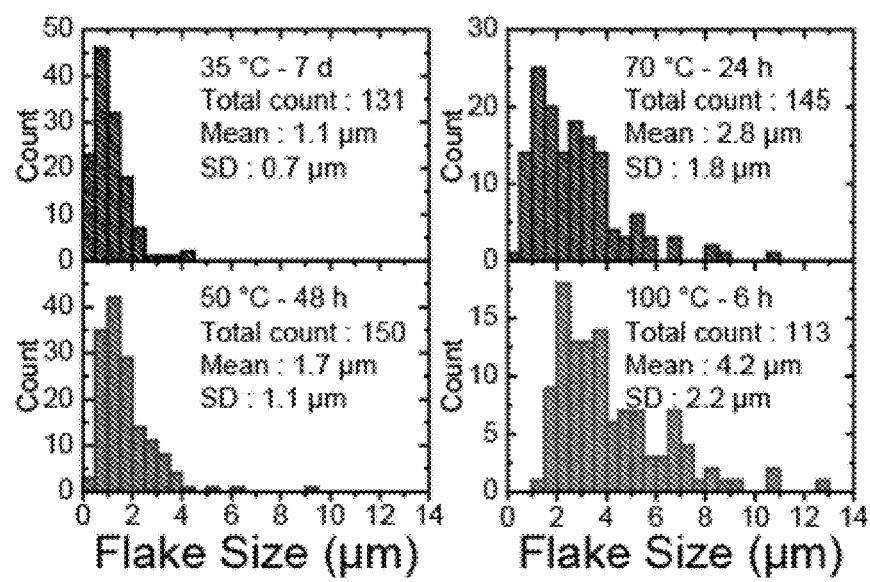
FIG. 5 shows the results of analyzing the size and size distribution of MXene sheets according to Examples 1 to 4 with an electron microscope.

FIG. 4 shows electron microscope images of the monolayer MXenes obtained in Examples 1 to 4. FIG. 5 shows MXene particle size distributions measured in FIG. 4. Referring to FIG. 5, it can be seed that MXenes synthesized at a higher temperature for a shorter time have a relatively larger average size.

Experimental Example 2

Dispersibility of MXene in Solvents

Figure 6:
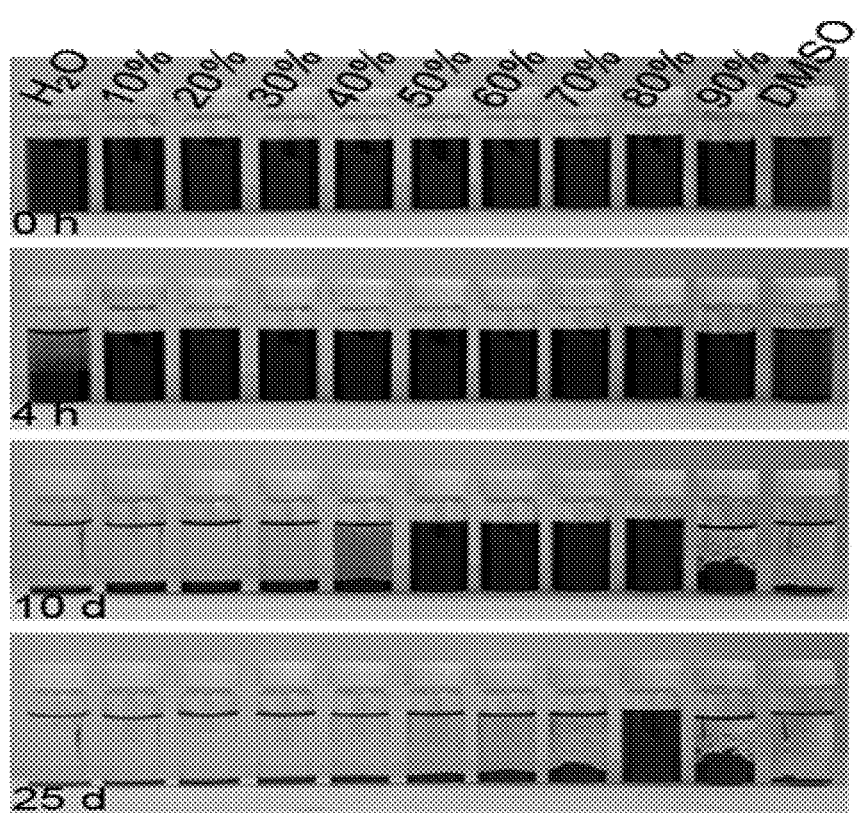
FIG. 6 shows photographic images illustrating the dispersion stability of MXene produced in Example 1 in a mixed solvent of water and dimethyl sulfoxide (DMSO) having various composition ratios.

FIG. 6 shows photographic images taken over time after adding the MXene produced in Example 1 to water, DMSO, or a mixed solvent of water and DMSO. In FIG. 6, it can be seen that the MXene produced in Example 1 is not well dispersed in water or DMSO, but is stably dispersed in the mixed solvent of water and DMSO. However, it can be seen that when a predetermined amount of water is added, MXene particles are oxidized and thus precipitate over time. This is different from the characteristics of a conventional MXene synthesized in a hydrous solvent. The conventional MXene synthesized in a hydrous solvent is well dispersed in both water and DMSO.

Experimental Example 3

Crystal Structure of MXene

Figure 7:
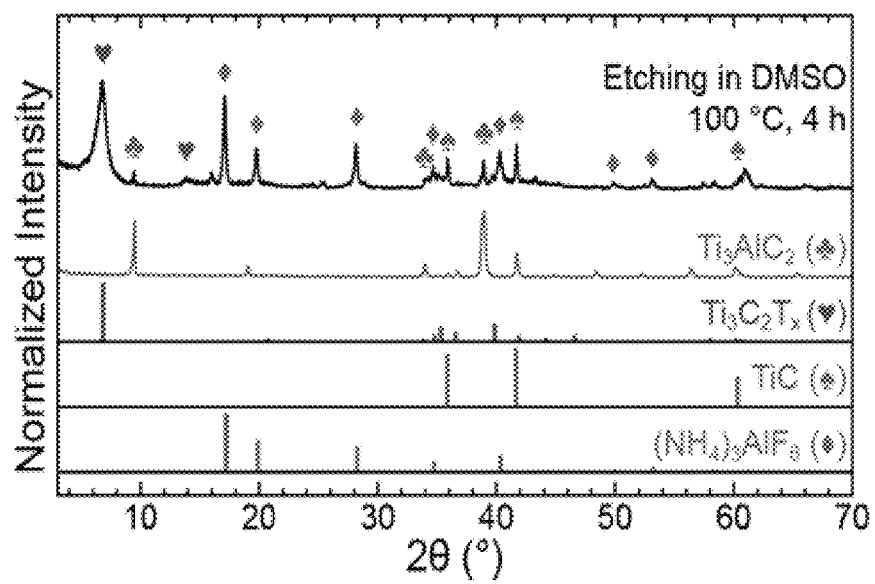
FIG. 7 shows the X-ray diffraction (XRD) analysis results of the reactants, desired product, and undesired product of a synthesis reaction of Example 1.

FIG. 7 shows the results of analyzing the crystal structure of the synthesis reaction product of Example 1 using XRD (Rigaku D/MAX-2500 WPC). As shown in FIG. 7, diffraction peaks of a MAX crystal structure disappeared, and diffraction peaks corresponding to the structure of a MXene and diffraction peaks corresponding to the crystal structure of $(NH_4)_3AlF_6$, a by-product, appeared. This means that a MXene can be effectively synthesized under the conditions of Example 1 and that the by-product of the reaction is ammonium fluoroaluminate.

Figure 8:
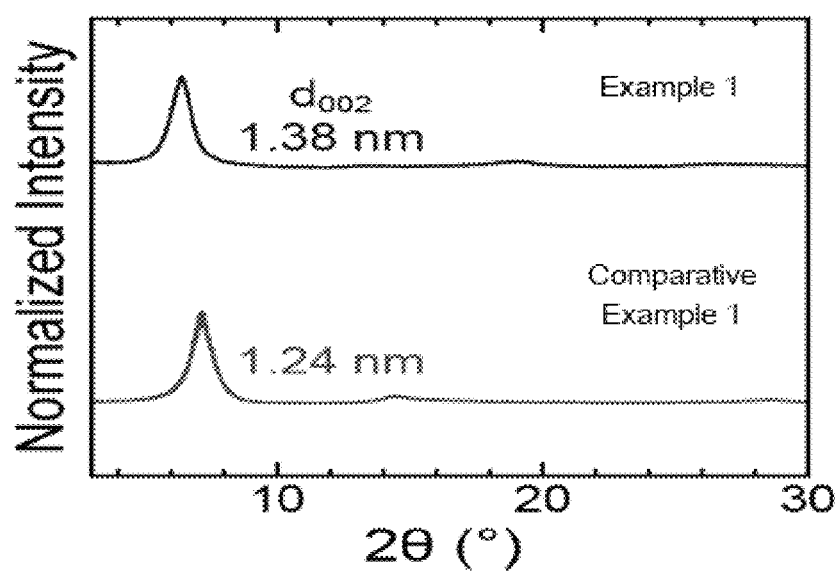
FIG. 8 shows the XRD analysis results of Example 1 and Comparative Example 1.
Figure 9:
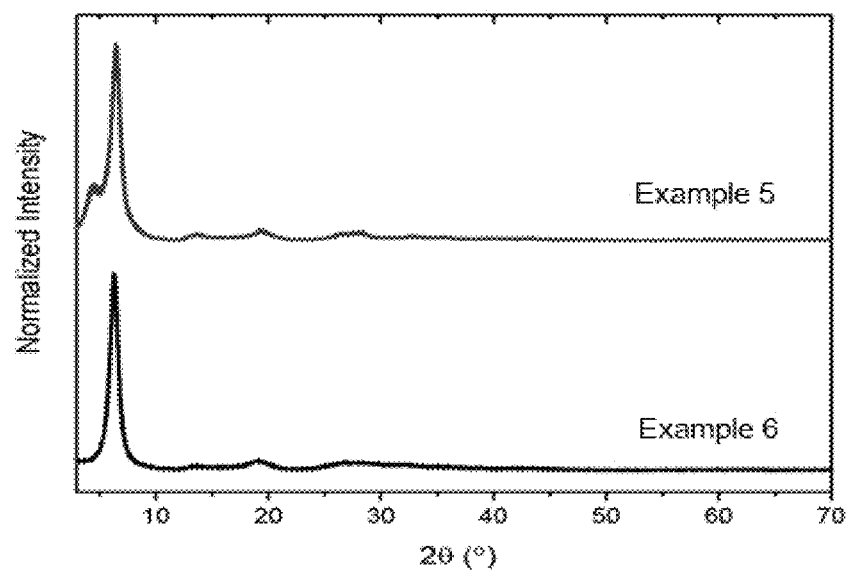
FIG. 9 shows the XRD analysis results of Examples 5 and 6.
Figure 10:
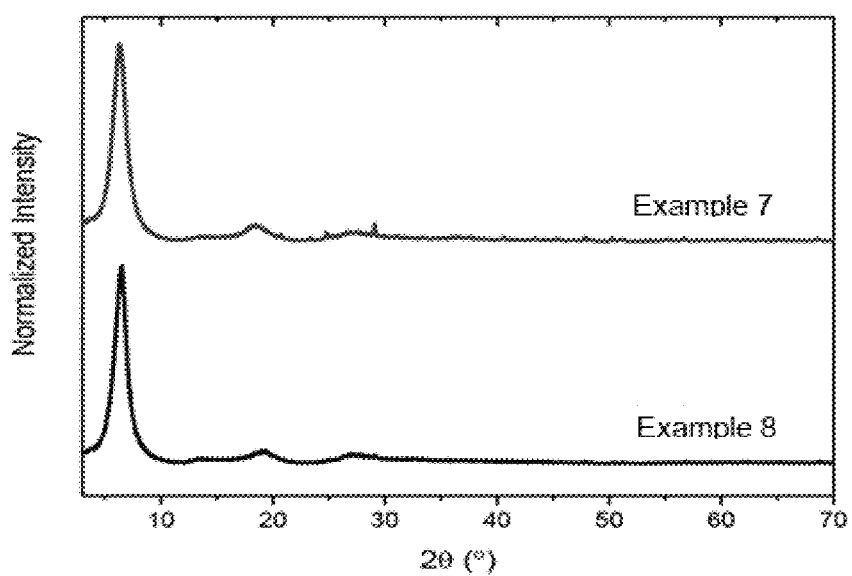
FIG. 10 shows the XRD analysis results of Examples 7 and 8.
Figure 11:
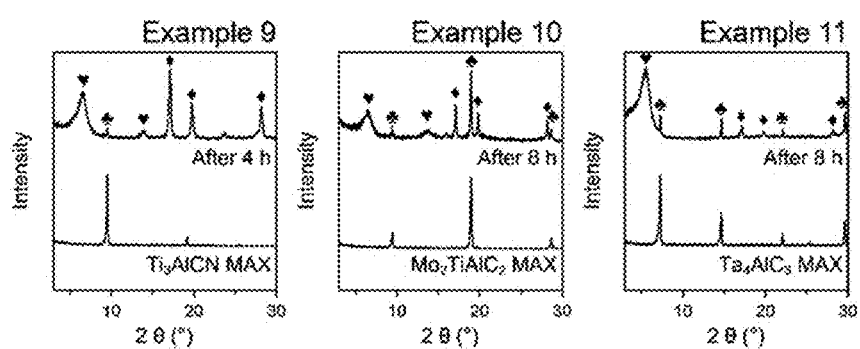
FIG. 11 shows the XRD analysis results of Examples 9 to 11.

FIGS. 8 to 10 show XRD analysis results of samples obtained through washing and purification with distilled water. From the results of Examples 5 and 6 shown in FIG. 9, it can be seen that a general acid soluble in an anhydrous solvent can also be applied in the present invention. From the results of Examples 7 and 8 in FIG. 10, it can be seen that general cations intercalated into layers of a MXene can be applied as an ionic compound in the present invention. In the results of Examples 9 to 11 in FIG. 11, XRD peaks of newly synthesized MXenes can be observed, which means that a MXene can be synthesized within a few hours. In a conventional hydrous method, it usually takes one to three days to produce a MXene.

Experimental Example 4

MXene Production Reaction Rate Based on XRD

Figure 12A:
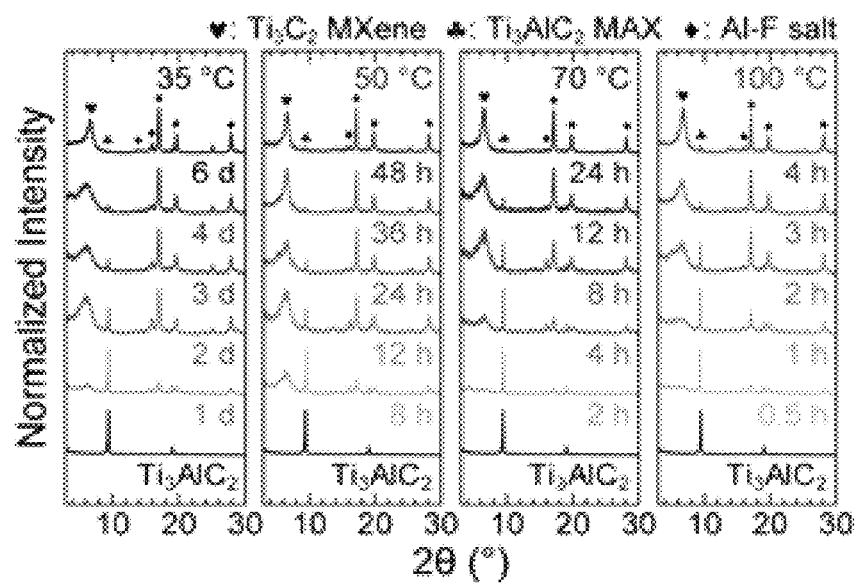
FIG. 12A shows the XRD analysis result of Examples 1 to 4.
Figure 12B:
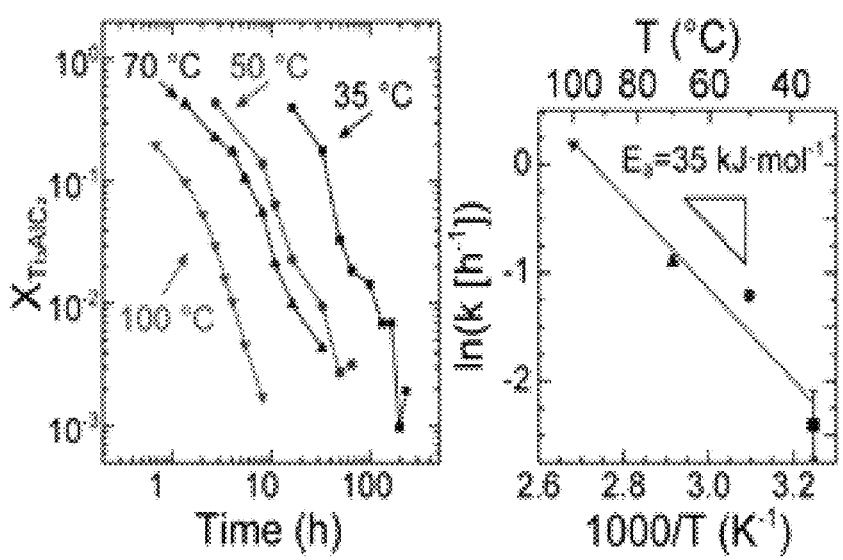
FIG. 12B shows the time-mole fraction graph and temperature-reaction rate constant of Examples 1 to 4.

Products obtained while varying a reaction time under the temperature conditions of Examples 1 to 4 were analyzed by XRD (time-resolved XRD, FIG. 12A). Here, the mole fraction of a MAX was calculated using the area ratio of peaks corresponding to (hk1)=(002) of MAX and MXene unit cells. As a result of plotting the mole fraction according to time, it can be seen that the etching reaction of the MAX is a first-order reaction (FIG. 12B). In addition, from the relationship (Arrhenius equation) between a reaction rate constant obtained here and temperature, it can be seen that the activation energy of the relevant reactions is 35 kJ/mol (FIG. 12B).

Figure 13A:
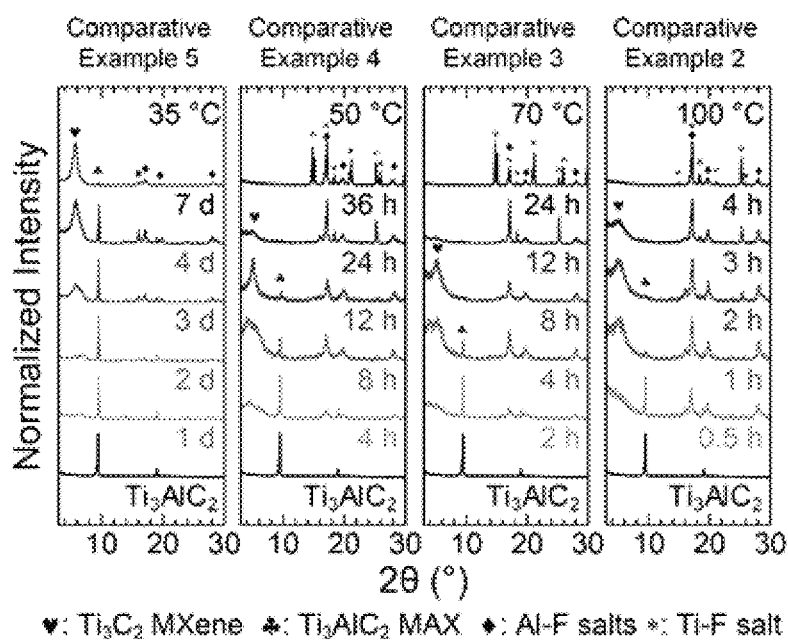
FIG. 13A shows the ACRD analysis result of Comparative Examples 2 to 5.
Figure 13B:
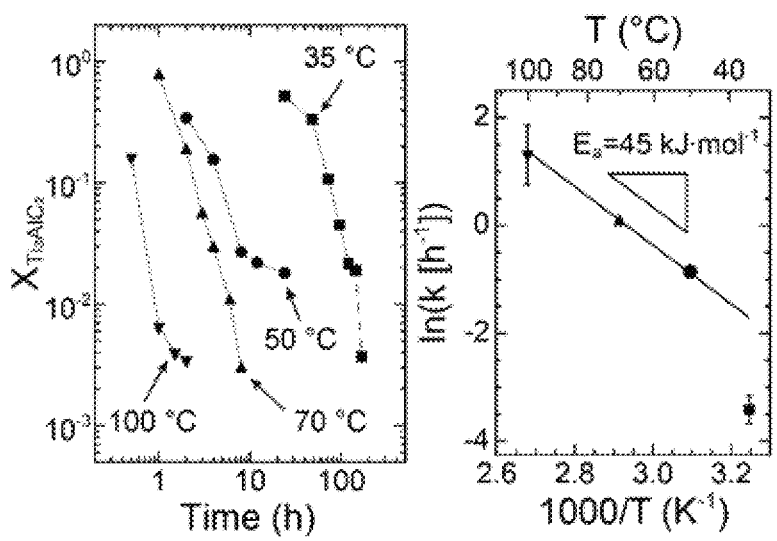
FIG. 13B shows the time-mole fraction graph and temperature-reaction rate constant of Comparative Examples 2 to 5.

Comparative Examples 2 to 5 were analyzed in the same manner (FIGS. 13A and 13B). From the results, it can be seen that the reactions of the Comparative Examples had an activation energy of 45 kJ/mol (FIG. 13B). In this case, when an acid is not added to an etching composition, a reaction rate varies more sensitively to a temperature change. In addition, when an acid is not added, an etching reaction may proceed more quickly, but it can be seen from the generation of by-products that the decomposition reaction of a MXene also proceeds quickly.

Experimental Example 5

XPS Analysis of MXene

Figure 14:
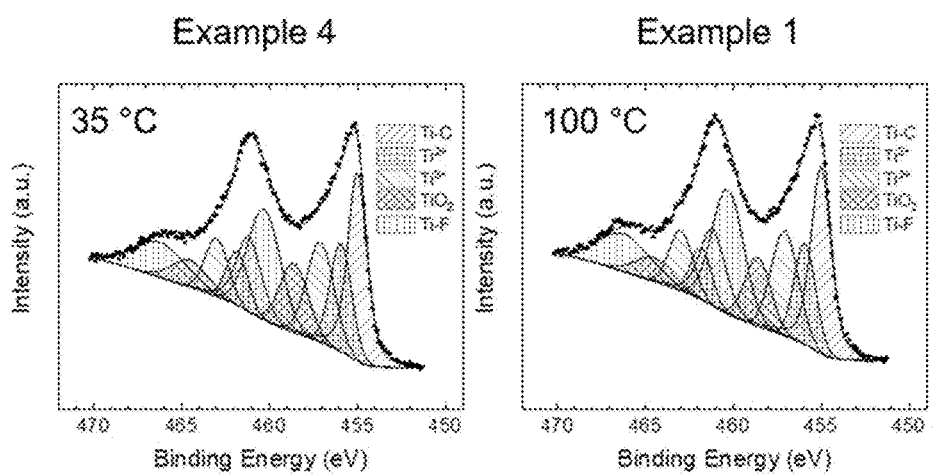
FIG. 14 shows the X-ray photoelectron spectroscopy (XPS) analysis results of Examples 1 and 4.
Figure 15:
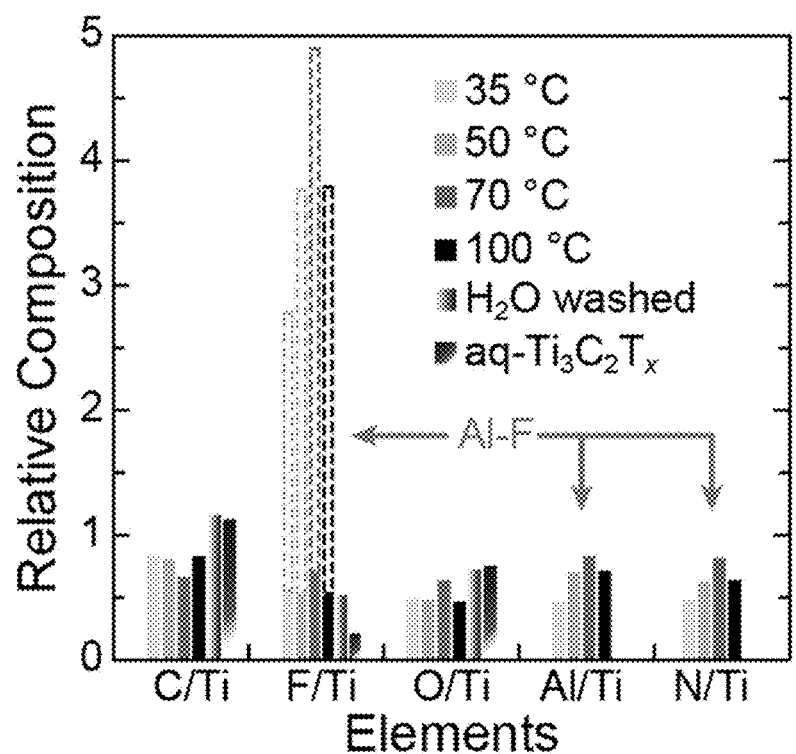
FIG. 15 is a table illustrating compositional analysis results of Examples, Comparative Examples, and raw materials obtained by XPS.

When the synthesis temperature is high, the structure of a MXene material may change or the MXene may be decomposed. However, it can be seen that the Ti oxidation state analysis results of Examples 1 to 4 measured by XPS are the same (FIG. 14). As a result of quantitative analysis of the elements, it can be seen that the MXenes synthesized by the method of the present invention had a higher F content than a conventional MXene synthesized using a hydrous solvent (FIG. 15). Therefore, it can be seen that a MXene synthesis reaction can be carried out stably and quickly at high temperature using an etching composition of the present invention.

Here, the XPS results were obtained using a PHI 5000 VersaProbe (ULVAC-PHI, Inc.) instrument. The XPS analysis was performed using incident monochromatic Al Kα (1,486.6 eV) light in the vacuum of about $2\times10^{-7}$ Pa. Immediately before measurement, $Ar^+$ ion beam sputtering treatment (2 kV, 1 min) was performed to remove adsorbates on the surface. Each high-resolution XPS profile was subjected to Shirley background correction and then analyzed according to the Gaussian-Lorentzian approach.

Experimental Example 6

Film Properties

Figure 16:
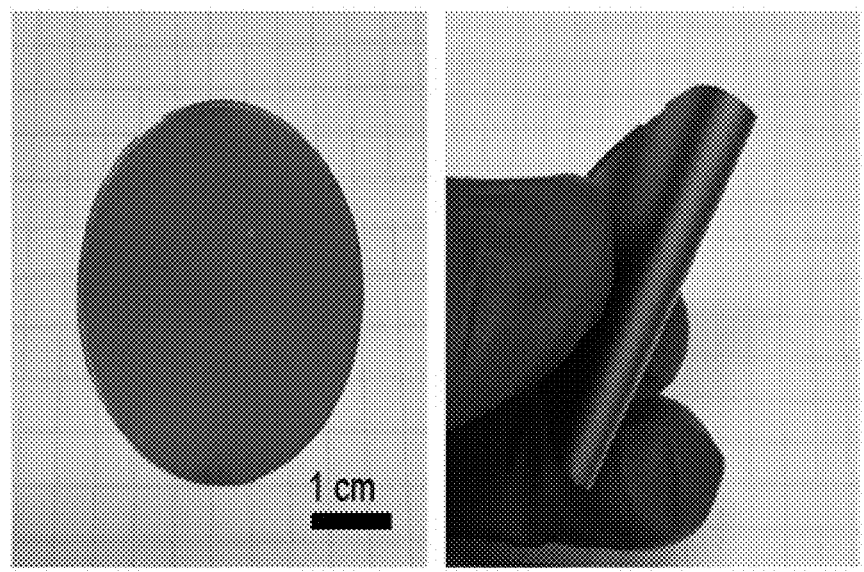
FIG. 16 shows photographs of a freestanding MXene laminate film produced in one Example.
Figure 17:
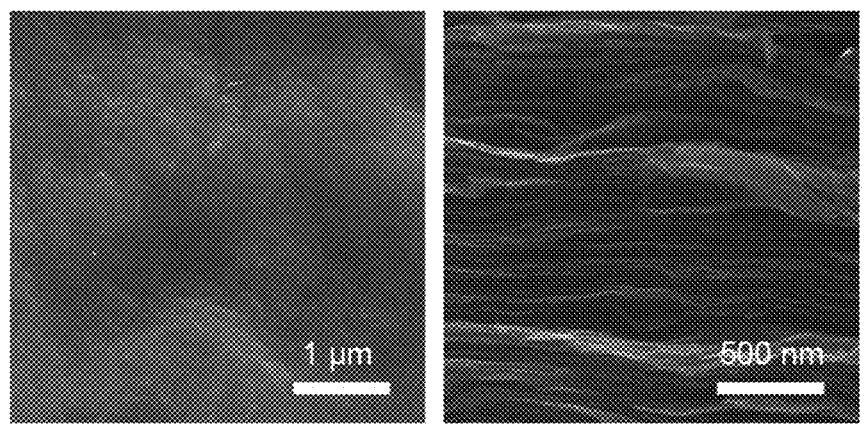
FIG. 17 shows scanning electron microscope images of a MXene laminate film produced in one Example.
Figure 18:
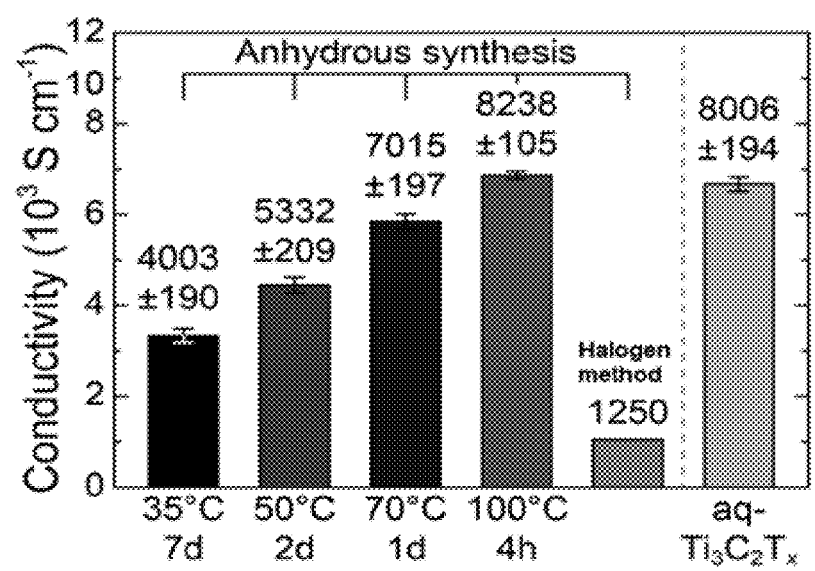
FIG. 18 shows the electrical conductivity of MXenes produced while varying temperature and time.

MXene particles obtained in the Examples were processed into freestanding films using a vacuum filtration technique (FIGS. 16 and 17), After drying the films in a vacuum oven, electrical conductivity was measured, and it can be seen that the MXenes synthesized at a higher temperature for a shorter time had higher electrical conductivity (FIG. 18). It is assumed that this is because the size of a MXene sheet affected electrical conductivity. The film of Comparative Example 1 synthesized by a conventional hydrous reaction also exhibited a similar level of electrical conductivity. Electrical conductivity was measured using a four-point probe (MCP-TP06 PSP) connected to a Loresta-GP meter (Model MCP-T610, Mitsubishi Chemical).

Figure 19A:
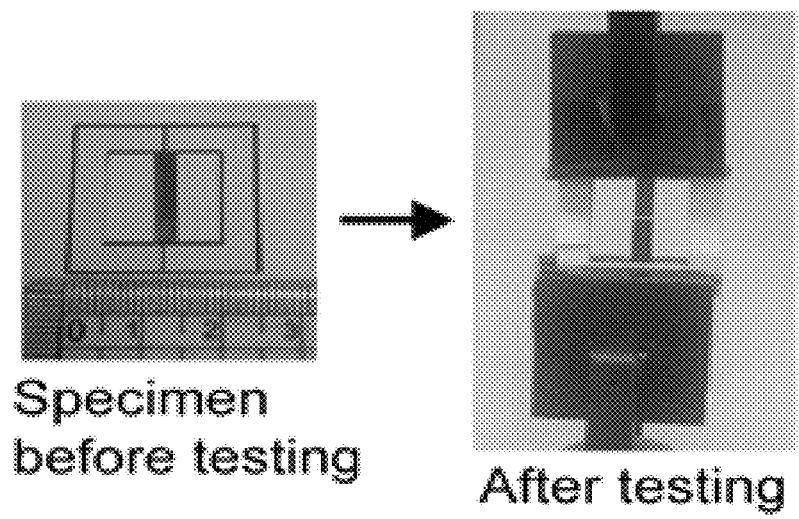
FIG. 19A shows pictures of a specimen for tensile strength measurement.
Figure 19B:
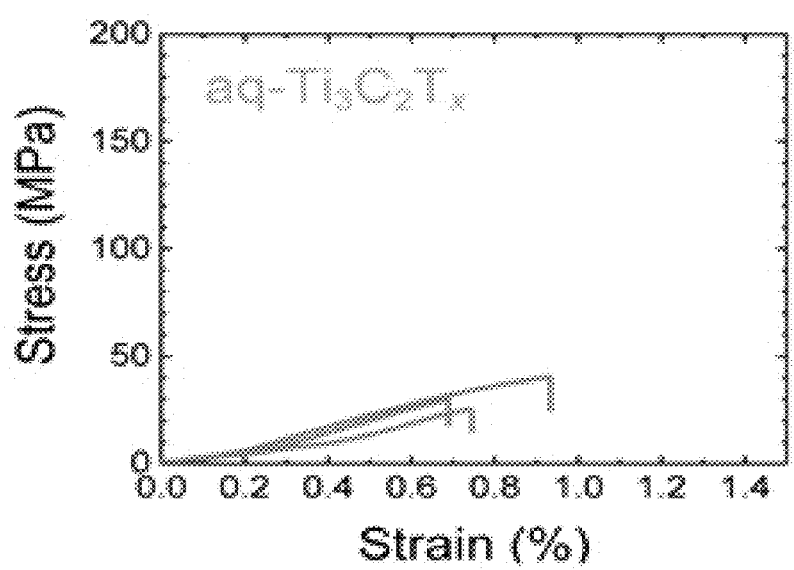
FIG. 19B shows strain-stress curve of conventional MXene films synthesized in an aqueous hydrofluoric acid.
Figure 19C:
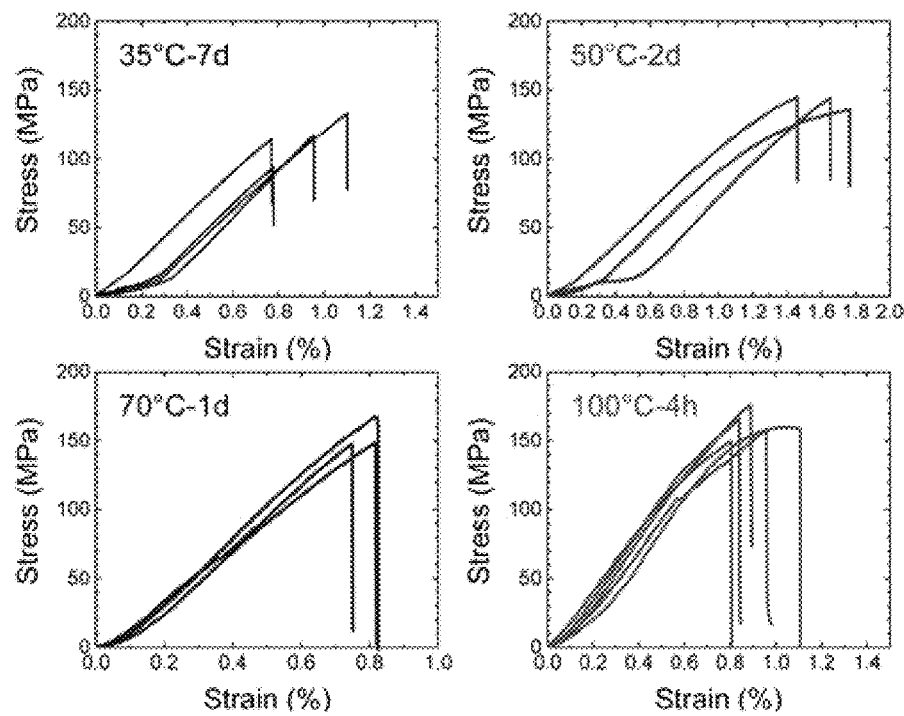
FIG. 19C shows strain-stress curves of Examples.

As a result of measuring the tensile strength of the MXene films synthesized in the Examples, it can be seen that the ultimate tensile strength of the films is five to seven times larger than that of conventional MXene films synthesized in air aqueous hydrofluoric acid (FIGS. 19B and 19C). It is assumed that this is because the MXenes synthesized in the Examples formed different surface functional groups from conventional ones and thus the attractive force between the MXene particles is increased. The tensile strength was measured using an Instron 68SC-1 instrument with a 5 N-load cell or a Tinius Oslon h5kt instrument with a 100 N-load cell at a tensile rate of 0.2 mm/min. Specimens for measuring the tensile strength had a shape with a width of 3 mm, a length of 15 min, and a thickness of about 6 μm to 10 μm (FIG. 19A).

An etching composition of the present invention can stably and quickly produce a MXene at high temperature.

An etching composition of the present invention can produce a MXene in high yield.

An etching composition of the present invention can easily produce various types of MXenes.

A method using an etching composition of the present invention can produce a MXene having excellent electrochemical and mechanical properties.

A method of producing a MXene of the present invention can stably and quickly produce various types of MXenes having excellent electrochemical and mechanical properties in high yield.

The MXene of the present invention has excellent electrochemical and mechanical properties.

What is claimed is:

1. An etching composition for etching an element A in a MAX material, the composition comprising:
   an etchant including a halogen element;
   an ionic compound comprising a hexafluorophosphate ($PF_6^-$) anion;
   an acid having a pKa of 3 or less; and
   an anhydrous solvent;
   wherein the etching composition is anhydrous and comprises 1 ppm or less of water.

2. The etching composition of claim 1, wherein the concentration of the etchant is in the range of 50 mg/mL to 300 mg/mL.

3. The etching composition of claim 1, wherein the concentration of the ionic compound is in the range of 50 mg/mL to 300 mg/mL.

4. The etching composition of claim 1, wherein the volume fraction of the acid in the composition is in the range of 5% to 30%.

5. The etching composition of claim 1, wherein the etchant is at least one of $NH_4HF_2$, pyridinium fluoride, a salt of $PF_6^-$, and a metal fluorine compound.

6. The etching composition of claim 5, wherein the etchant is $NH_4HF_2$.

7. The etching composition of claim 1, wherein the ionic compound is at least one of a $PF_6^-$ salt of an ammonium cation and a $PF_6^-$ salt of a metal cation.

8. The etching composition of claim 7, wherein the ionic compound is a $PF_6^-$ salt of an ammonium cation.

9. The etching composition of claim 7, wherein the ionic compound is at least one of ammonium hexafluorophosphate, tetrabutylammonium hexafluorophosphate, tetramethylammonium hexafluorophosphate, lithium hexafluorophosphate, sodium hexafluorophosphate, and potassium hexafluorophosphate.

10. The etching composition of claim 1, wherein the acid is at least one of a sulfonic acid-based compound, a sulfuric acid-based compound, a phosphoric acid-based compound, and an acetic acid-based compound.

11. The etching composition of claim 1, wherein the anhydrous solvent is at least one of dimethyl sulfoxide, glycerin, N,N-dimethylformamide, propylene carbonate, and tetrahydrofuran.

12. The etching composition of claim 11, wherein the anhydrous solvent is dimethyl sulfoxide.

13. The etching composition of claim 1, wherein the boiling point of the anhydrous solvent is more than 100° C.

14. A method of producing a MXene, comprising a step of synthesizing a MXene including etching element A in a MAX material, wherein the etching of the element A in the MAX material in the step of synthesizing a MXene is carried out using the etching composition of claim 1.

15. The method of claim 14, wherein the step of synthesizing a MXene is performed at a temperature of 50° C. or more.

16. The method of claim 14, wherein the step of synthesizing a MXene is performed for a time of 24 hours or less.

17. The method of claim 14, wherein the MAX material is a compound represented by the following Chemical Formula 1:

$$M_{n+1}AX_n \qquad \text{[Chemical Formula 1]}$$

wherein, in Chemical Formula 1, M is a transition metal, A is a Group 13 element or a Group 14 element, X is carbon or nitrogen, and n is an integer in the range of 1 to 4.

* * * * *